United States Patent [19]

Kanno

[11] Patent Number: 5,295,877
[45] Date of Patent: Mar. 22, 1994

[54] SPEED DETECTING SYSTEM FOR MARINE PROPULSION UNIT

[75] Inventor: Isao Kanno, Hamamatsu, Japan

[73] Assignee: Sanshin Kogyo Kabushiki Kaisha, Shizuoka, Japan

[21] Appl. No.: 982,843

[22] Filed: Nov. 30, 1992

[30] Foreign Application Priority Data

Dec. 5, 1991 [JP] Japan .................................. 3-348332

[51] Int. Cl.⁵ .................................................. B60L 1/14
[52] U.S. Cl. ............................................. 440/2; 73/182
[58] Field of Search ....................... 440/1, 2; 73/182

[56] References Cited

U.S. PATENT DOCUMENTS

| | | | |
|---|---|---|---|
| 3,084,543 | 4/1963 | Finkl et al. | 73/182 |
| 3,126,738 | 3/1964 | Taylor | 73/182 |
| 4,070,909 | 1/1978 | Carpenter | 73/182 |
| 4,821,567 | 4/1989 | Nakamura et al. | 73/182 |

Primary Examiner—Jesûs D. Sotelo
Attorney, Agent, or Firm—Knobbe, Martens, Olson & Bear

[57] ABSTRACT

An improved speed detecting system for a marine propulsion unit of the pressure sensing type. The pressure sensing port is connected to the indicator by a conduit which has a high portion where the conduit passes over the transom into the hull. The volume between the pressure sensing portion and this high point is greater than the volume of water displaced when the watercraft is traveling at the highest speed so that no water will pass over the high portion and be trapped in the remainder of the conduit. In addition, the water will drain out of the system when the watercraft is at rest.

12 Claims, 1 Drawing Sheet 5,295,877

SPEED DETECTING SYSTEM FOR MARINE PROPULSION UNIT

BACKGROUND OF THE INVENTION

This invention relates to a speed detecting system for a marine propulsion unit and more particularly to an improved dynamic pressure type of speed detecting system.

Various types of devices have been proposed for providing a speed indication for a watercraft. One device that is particularly popular and extremely effective is the so-called dynamic pressure sensitive type wherein the hull or propulsion unit is formed with a forwardly facing water inlet opening that receives dynamic water pressure as the watercraft moves through the body of water. The dynamic pressure is relatively directly related to watercraft speed. This pressure is transmitted to a remotely positioned indicator through a conduit, normally a flexible type one. There is, however, one disadvantage with this type of system.

That is, the conduit that extends from the water pressure sensing port to the instrument normally has high and low points with the highest point normally being the point where the conduit passes across the transom of the watercraft whereas the lowest point is somewhere within the hull of the watercraft. As a result of this arrangement, when the device is first installed and once the first speed indication is given, some water will pass into the conduit over the high point and collect in the low point or points. When the watercraft becomes stationary, this water is trapped in the lower points of the conduit and will create a standing pressure on the speed detector. Hence, when the watercraft next begins its travel, the speed indicator will not provide a speed indication until the water pressure exceeds the static water pressure remaining in the system. Alternatively, the device will begin to render inaccurate signals after water accumulates in the low portions of the conduit.

It is, therefore, a principal object of this invention to provide an improved speed detecting system for a watercraft.

It is a further object of this invention to provide a speed detecting system of the pressure sensitive type which does not have the aforenoted defects.

SUMMARY OF THE INVENTION

This invention is adapted to be embodied in a pressure sensitive speed indicator for a watercraft that includes a conversion unit adapted to convert fluid pressure into a speed signal. The conversion unit has a pressure input port. A water pressure sensing port is positioned to receive dynamic water pressure as the watercraft travels through a body of water and conduit means interconnect the pressure sensing port with the pressure inlet port to transmit a fluid pressure signal thereto. The conduit means has a low portion connected at the outlet end to the pressure inlet port and a first high portion higher than the lowest point of said lowest portion and said water pressure sensing port. The conduit means has a volume between the pressure sensing port and the first high point that is sufficient that at the highest expected watercraft speed, the fluid pressure at the pressure sensing port will not cause water to flow past the first high part in the conduit means into the lowest portion.

BRIEF DESCRIPTION OF THE DRAWING

The single figure of the drawing constitutes a partially schematic side elevational view of a watercraft with a speed detector constructed in accordance with an embodiment of the invention.

DETAILED DESCRIPTION OF THE PREFERRED EMBODIMENT OF THE INVENTION

Figure 1:
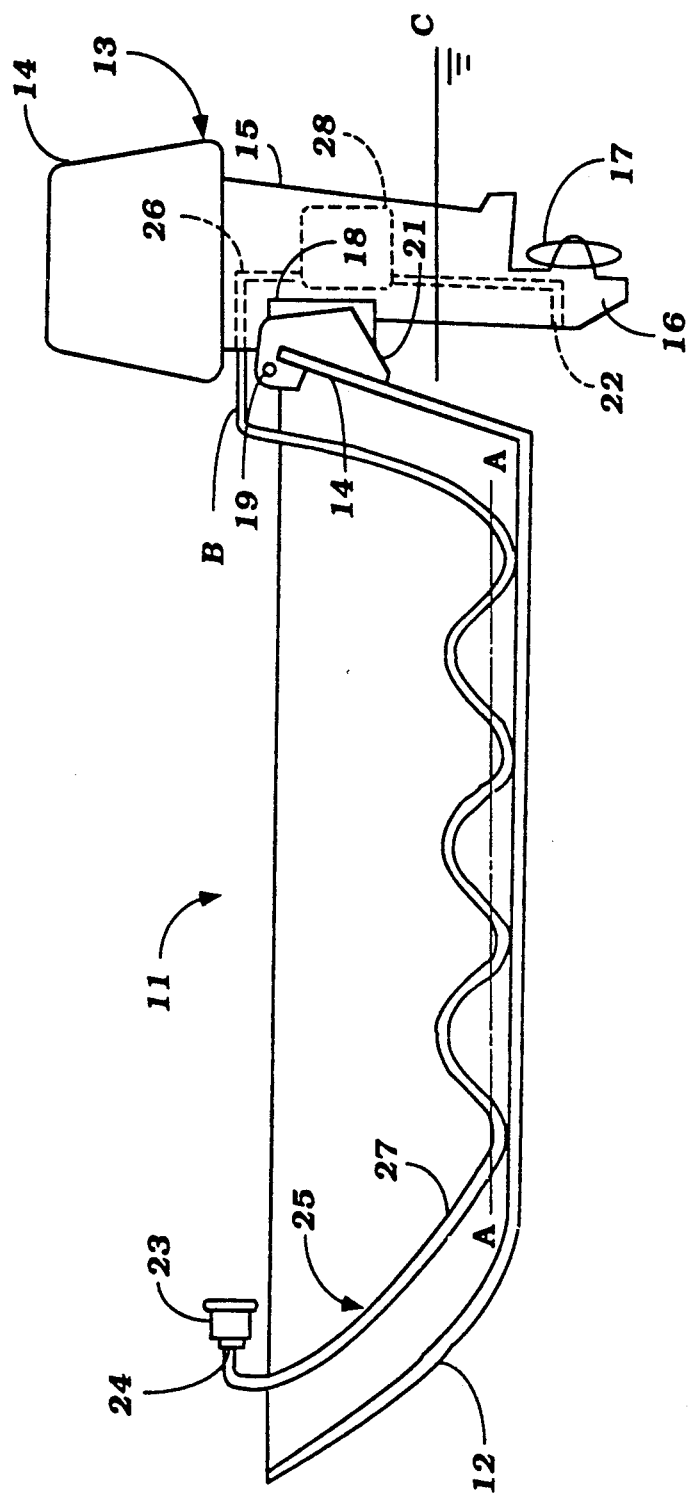

In the single figure, a watercraft having a speed detecting system constructed in accordance with an embodiment of the invention is identified generally by the reference numeral 11. The watercraft 11 is comprised of a hull 12 which may have any suitable configuration and which has a propulsion device, indicated generally by the reference numeral 13 mounted on its transom 10. In the illustrated embodiment, the propulsion device 13 is an outboard motor. It is to be understood, however, that the invention may be employed with other types of propulsion devices including inboard/outboard units.

The outboard motor 13 includes a power head 14 having a powering internal combustion engine and a surrounding protective cowling. The engine drives a driveshaft (not shown) which depends into and is rotatably journaled within a driveshaft housing 15. The driveshaft housing 15 terminates at a lower unit 16 in which a forward/neutral transmission (not shown) is provided for driving a propeller 17 in a well known manner. The propulsion unit 13 also includes a steering shaft (not shown) that is mounted within a swivel bracket 18 for steering movement about a generally vertically extending axis. The swivel bracket 18 is, in turn, pivotally connected by means of a pivot pin 19 to a clamping bracket 21 for tilt and trim movement. The clamping bracket 21 is affixed in any suitable manner to the transom 10. The construction of the propulsion unit 13 may be of any known type and the invention is not particularly limited to the type of propulsion unit employed. However, the invention does have particular utility in conjunction with speed sensing devices wherein a water pressure sensing port 22 is formed in the lower unit 16 of the propulsion unit 13 for providing a dynamic water pressure signal for a speed detecting and indicating system now to be described.

This speed detecting and indicating system includes a speed indicator 23 which is mounted at an appropriate position within the hull 12 so as to be readily viewed by the operator. The speed indicator 23 has a pressure input port 24 to which the fluid pressure from the sensing port 22 is transmitted, in a manner to be described. The speed indicator 23 has a conversion system for converting pressure into a speed signal and displaying a visual indication of that speed, either in a digital or analog manner.

A conduit, indicated generally by the reference numeral 25, extends from the pressure sensing port 22 to the pressure inlet port 24. It should be noted that this conduit extends through the lower portion of the hull 12 and over the transom 10 where it meets the propulsion unit 13 at a first high point indicated by the line B so as to define a first conduit section 26 and a second conduit section 27. The conduit section 27 has a low point which extends along the bottom of the hull 12 but which may have up and down portions, some of which fall below a line A to define the lowest parts of the conduit 25. These points are lower than the water level C which forms the base line for the first portion 26 since water will always be present in the conduit portion 26 up to the water level C regardless of whether the watercraft 11 is moving or not. Without the invention, to be described, water may flow over the high portion B and collect in the conduit portion 27. This water will not return back to the body of water in which the watercraft 11 is operating when the vessel stops and hence, pressure will be trapped in the conduit 27 and particularly the portion above the line A and to the pressure sensing inlet port 24. This trapped pressure can give rise to incorrect readings and also, the device may not read speed until the speed is above that which generates the pressure trapped in the conduit portion 27.

In order to avoid this and in accordance with the invention, the conduit portion 26 between the water level C and the high point B has a volume sufficiently to hold all of the water which will be displaced from the pressure sensing port 22 at the highest anticipated speed of travel. In order to permit this, an accumulator chamber 28 is provided in the conduit portion 26 so as to provide adequate volume to hold all of this water. Hence, water will never pass over the high point 18 into the conduit portion 27 and this problem will be avoided. This volume is achieved by meeting the following relationship:

$$V_a \div V_b = P_b / P_a$$

where:

$V_a$ is the total volume of the passage 26 above the water level C when the watercraft is at rest, $V_b$ is the volume of water displaced at the highest speed anticipated, $P_a$ is the water pressure while the watercraft is at rest, and $P_b$ is the water pressure while the boat is running at the highest velocity.

Once this relationship is established, whenever the watercraft slows from its highest speed, all of the water in the conduit portion 26 will return to the body of water in which the watercraft is traveling and no water will be trapped in the system that could cause it to pass over the high level B into the conduit portion 27. Also when the outboard motor 13 is tilted up, all water will flow out of the conduit portion 26 and accumulator 28.

It is to be understood that the foregoing description is that of a preferred embodiment of the invention and that various changes and modifications may be made without departing from the spirit and scope of the invention, as defined by the appended claims.

I claim:

1. A pressure sensitive speed indicator for a watercraft, said speed indicator including a conversion unit adapted to convert a fluid pressure into a speed signal, said conversion unit having a pressure inlet port, a water pressure sensing port positioned to receive dynamic water pressure as said watercraft travels through a body of water, and conduit means for interconnecting said pressure sensing port to said pressure inlet port for transmitting a fluid pressure signal thereto, said conduit means having a low portion connected at its outlet end to said pressure inlet port and a first high portion higher than the lowest part of said lowest portion and said water pressure sensing port, said conduit means having a volume between said pressure sensing port and said first high portion of volume sufficient that at the highest expected watercraft speed, the fluid pressure at said pressure sensing port will not cause water to flow past said first high part in said conduit means into said lower portion.

2. A pressure sensitive speed indicator as set forth in claim 1 wherein the conduit means includes an accumulator volume forming portion of the volume.

3. A pressure sensitive speed indicator as set forth in claim 2 wherein the volume drains back into the body of water in which the watercraft is operating when the watercraft is not in motion.

4. A pressure sensitive speed indicator as set forth in claim 3 wherein the first high portion is formed where the conduit means enters the interior of the hull.

5. A pressure sensitive speed indicator as set forth in claim 1 wherein the first high portion is the highest portion of the conduit means between the pressure sensing port and the lowest portion.

6. A pressure sensitive speed indicator as set forth in claim 5 wherein the first high portion is formed where the conduit means enters the interior of the hull.

7. A pressure sensitive speed indicator as set forth in claim 1 wherein the watercraft is provided with an outboard drive having a propulsion unit and the pressure sensing port is formed in the outboard drive.

8. A pressure sensitive speed indicator as set forth in claim 7 wherein the volume is formed substantially completely within the outboard drive outer housing.

9. A pressure sensitive speed indicator as set forth in claim 8 wherein the conduit means includes an accumulator volume forming portion of the volume.

10. A pressure sensitive speed indicator as set forth in claim 9 wherein the accumulator volume is formed in the outboard drive.

11. A pressure sensitive speed indicator as set forth in claim 10 wherein the volume drains back into the body of water in which the watercraft is operating when the watercraft is not in motion.

12. A pressure sensitive speed indicator as set forth in claim 11 wherein the first high portion is formed where the conduit means enters the interior of the hull.

* * * * *